United States Patent
Kelley et al.

(10) Patent No.: US 7,076,637 B2
(45) Date of Patent: Jul. 11, 2006

(54) SYSTEM FOR PROVIDING TRANSITIONS BETWEEN OPERATING MODES OF A DEVICE

(75) Inventors: Brian Harold Kelley, San Diego, CA (US); Ramesh Chandrasekhar, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 274 days.

(21) Appl. No.: 10/697,592

(22) Filed: Oct. 29, 2003

(65) Prior Publication Data

US 2005/0097252 A1 May 5, 2005

(51) Int. Cl.
*G06F 9/48* (2006.01)

(52) U.S. Cl. .................. 712/43; 712/229; 712/244; 718/108

(58) Field of Classification Search ............. 712/43, 712/229, 244; 718/107, 108
See application file for complete search history.

(56) References Cited

U.S. PATENT DOCUMENTS 5,515,538 A * 5/1996 Kleiman .................. 710/260
6,175,916 B1 * 1/2001 Ginsberg et al. ......... 712/228

OTHER PUBLICATIONS

Liedtke et al., "Lazy Process Switching", Proceedings of the Eigth Workshop on Hot Topics in Operating Systems, IEEE, May 20-22, 2001, pp. 15-18.*

Bershad et al. "Extensibility Safety and Performance in the SPIN Operating System", Proceedings of the Fifteenth Symposium on Operating Systems Principles, ACM, 1995, pp. 267-283.*

* cited by examiner

*Primary Examiner*—William M. Treat
(74) *Attorney, Agent, or Firm*—Philip R Wadsworth; Robert J. O'Connell

(57) ABSTRACT

System for providing transitions between operating modes of a device. The system includes a method for providing transitions between a privileged and a non-privileged operating mode. The method comprises executing an application in the non-privileged mode, generating an interrupt to request the services of a privileged function, and transitioning to the privileged mode to execute the privileged function, wherein the privileged function is executed as part of the same thread of execution as the application.

23 Claims, 3 Drawing Sheets

SYSTEM FOR PROVIDING TRANSITIONS BETWEEN OPERATING MODES OF A DEVICE

BACKGROUND

I. Field

The present invention relates generally to the efficient operation of a device, and more particularly, to a system that provides efficient transitioning between non-privileged and privileged operating modes of a device.

II. Description of the Related Art

Advances in technology have resulted in the development of a variety of devices for home, office, and personal use. For example, computer systems, such as desktops, notebooks, and tablet computers have become powerful tools for use at home or in office environments. Personal devices, such as wireless telephones, personal digital assistants (PDAs), and paging devices have also become more powerful and are now widely used.

Many devices now comprise complex hardware and software that run operating systems such as UNIX, LINUX, or similar operating systems. Generally, these operating systems provide for multiple modes of operation. For example, most systems provide privileged and non-privileged modes of operation. Programs executing in the privileged mode of operation are allowed to access memory and system resources without limitation. Programs executing in the non-privileged mode are restricted from accessing certain memory regions and/or device systems. This configuration provides a level of protection to important memory or device functions. For example, by executing third-party applications in the non-privileged mode, important memory regions and device functions can be protected from unauthorized access. Also, such an arrangement allows the system to isolate faults during execution.

However, in some situations, it is desirable to allow an application executing in the non-privileged mode to have access to privileged memory or device functions. For example, it may be desirable to allow an application to have access to a selected system file, or device hardware, such as a device modem. To accomplish this in conventional systems, a trap is utilized to suspend execution of the application while a separate privileged mode "kernel" task performs the requested operation. Unfortunately, providing a new privileged mode task results in additional scheduling complexity and overhead. There may also be additional system delays in the form of dispatcher latency. Furthermore, the new task may execute at a different priority than the non-privileged application from which it was invoked, thereby further complicating system scheduling and operation.

Therefore, what is needed is a system that provides a way for an application to transition between non-privileged and privileged operating modes in a device, where the transition does not require a new task to be created, thereby reducing scheduling complexity and avoiding potential dispatcher latency.

SUMMARY

In one or more embodiments, a system comprising methods and apparatus is provided that operates to provide transitions betweens operating modes of a device. For example, in one embodiment, a mechanism is provided that allows an application running in non-privileged mode to execute privileged mode functions within the same task (or execution thread), thereby avoiding task creation, scheduling, and dispatcher latency. Thus, the system maps well into existing software because access to privileged mode functions can be accomplished without changing the existing software model.

In one or more embodiments, transitions between protection domains (i.e., non-privileged to privileged mode) are independent of transitions between threads or tasks. Thus, the system operates so that a transition to a privileged mode does not result in a change of task priority. For example, in a conventional system privileged mode services are handled by a "kernel" task that runs at a different priority than non-privileged applications. However, the transition system described herein allows privileged functions to run within the same task and priority as the non-privileged application that invoked it.

In one embodiment, an interrupt (such as a software interrupt) is used to cause a transition between non-privileged and privileged operating modes. For example, the interrupt operates to request a privileged mode function or service. The interrupt includes an associated function identifier (i.e., an indicator or index) that indicates or identifies the privileged mode function that is being requested. Before the transition to privileged mode is allowed, the request is validated so that any illegal program operation is prevented. For example, the indicator is validated to make sure it is associated with a trusted privileged mode function. For example, in one embodiment, a trusted privileged mode function is a function or service that the operating system has determined will perform the desired function in a trusted and well-behaved manner. Furthermore, parameters passed to the privileged mode function from the non-privileged application are validated to confirm that the operation of the privileged function will not exceed the privileges granted to the application. For example, a non-privileged mode application is prevented from using a privileged function to access memory or other resources that the application does not have access rights to. Thus, a non-privileged mode application is prevented from using the transition system to access memory regions or device registers that it is not entitled to.

In one embodiment, the non-privileged mode application is registered with the system before execution, (either at runtime or compile time) and at that time, a set of restrictions or privileges for the non-privileged mode application is identified. For example, the restrictions may be based on a permissions list associated with the non-privileged mode application. During operation of the transition system, when the non-privileged application generates an interrupt to request a privileged function, the system operates to validate that the requested privileged function is a trusted function, and also verifies that the requested privileged function will operate within the access rights granted to the non-privileged application as defined by the permissions list. After the validation is complete, the function is performed in privileged mode. Thus, the privileged function operates within the same task or execution thread as the requesting non-privileged application, thereby avoiding task creation, scheduling, and dispatcher latency.

In one embodiment, a method for providing transitions between operating modes of a device is provided. The operating modes comprise a privileged mode and a non-privileged mode. The method comprises executing an application in the non-privileged mode, generating an interrupt to request the services of a privileged function, and transitioning to the privileged mode to execute the privileged function, wherein the privileged function is executed as part of the same thread of execution as the application.

In another embodiment, apparatus for providing transitions between operating modes of a device is provided. The operating modes comprise a privileged mode and a non-privileged mode. The apparatus comprises processing logic that operates to execute an application in the non-privileged mode. The apparatus also comprises interrupt logic that operates to receive an interrupt that requests the services of a privileged function. The apparatus also comprises transition logic that operates to transition to the privileged mode to execute the privileged function, wherein the privileged function is executed as part of the same execution thread as the application.

In another embodiment, apparatus for providing transitions between operating modes of a device is provided. The operating modes comprise a privileged mode and a non-privileged mode. The apparatus comprises means for executing an application in the non-privileged mode and means for receiving an interrupt that requests the services of a privileged function. The apparatus also comprises means for transitioning to the privileged mode to execute the privileged function, wherein the privileged function is executed as part of the same execution thread as the application.

In another embodiment, a computer-readable media is provided that comprises instructions, which when executed by a processor in a device, operate to provide transitions between operating modes of the device. The operating modes comprise a non-privileged mode and a privileged mode. The computer-readable media comprises instructions for executing an application in the non-privileged mode, instructions for generating an interrupt to request the services of a privileged function, and instructions for transitioning to the privileged mode to execute the privileged function, wherein the privileged function is executed as part of the same thread of execution as the application.

Other aspects, advantages, and features of the present invention will become apparent after review of the hereinafter set forth Brief Description of the Drawings, Detailed Description of the Invention, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes a transition system that provides transitions between operating modes of a device. For example, the system operates to provide fast and efficient transitions between non-privileged and privileged operating modes of a device, whereby a non-privileged application is able to perform privileged functions without a new task being generated. As a result, the system avoids the overhead of new task creation, scheduling and dispatcher latency.

In one or more embodiments, the transition system interacts with a runtime environment executing on the device that is used to simplify operation of the device, such as by providing generalized calls for device specific resources. One such runtime environment is the Binary Runtime Environment for Wireless™ (BREW™) software platform developed by QUALCOMM, Inc., of San Diego, Calif. The following description describes a device executing a runtime environment, such as the BREW software platform. However, in one or more embodiments, the transition system is suitable for use with other types of runtime environments to provide fast and efficient operating mode transitions in a variety of devices, including operating systems or other controlling or monitoring programs. For example, the devices may include, but are not limited to, desktop computers, notebook computers, handheld computers, and portable devices, such as wireless telephones, pagers, PDAs, email devices, tablet computers, or other type of computing devices.

Figure 1:
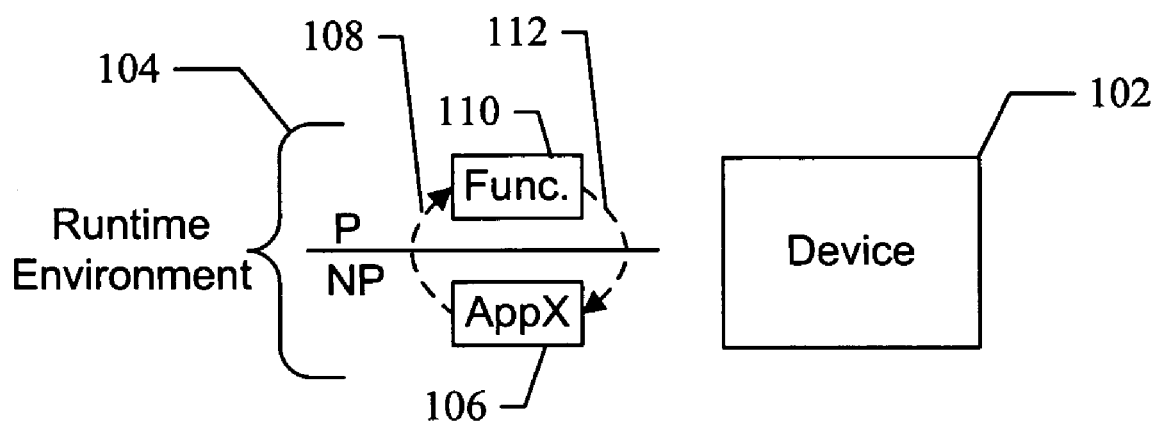
FIG. 1 shows a device that is suitable to implement one or more embodiments of a transition system to provide transitions between operating modes of the device as described herein.

FIG. 1 shows a device 102 that is suitable to implement one or more embodiments of a transition system to provide transitions between operating modes of the device 102 as described herein. The device 102 may be part of a home, office, or personal device, such as a wireless telephone or PDA, or any other type of computing device. During operation, one or more applications execute on the device 102 to provide information, functions, and/or services to the device 102. For example, one type of application may be a viewer application that operates to allow the device 102 to display movies, news, or other types of multimedia content.

In one embodiment, the device 102 includes a runtime environment 104 that is executing on the device 102, for instance, the BREW runtime environment. The runtime environment includes at least two modes of operation; namely a non-privilege mode (NP) and a privileged mode (P). The non-privilege mode of operation is used to restrict the access of applications running on the device. For example, applications running in non-privileged mode are restricted to selected memory regions and may be denied access to device registers or other resources. The privileged mode of operation allows applications running under this mode to access memory or device resources without limitation.

When an application executes on the device 102, it runs under the runtime environment to provide the desired functionality. For example, the application 106 runs on the device 102 under the non-privileged mode (NP) to provide the desired functionality. However, the application 106 may require functions or system services that are only available in privileged mode. For example, the application 106 may need to access privileged memory or device hardware resources. To obtain these functions or services, the transition system described herein provides a mechanism that allows the application 106 to transition control (as shown at 108) to a privileged mode function 110 after proper validation. The function 110 operates in the privileged mode to perform the requested function or service. The operation of the function 110 is within the same task or thread of execution as the non-privileged application 106. Once the functions or services provided in the privileged mode have been rendered, the transition system allows control to transition (as shown at 112) back to the non-privileged mode application.

Thus, the transition system provides for a fast and efficient transition to the privileged mode without the need for a new task to be created and scheduled for execution by the runtime environment, thereby eliminating scheduler complexity and associated dispatcher latency.

Figure 2:
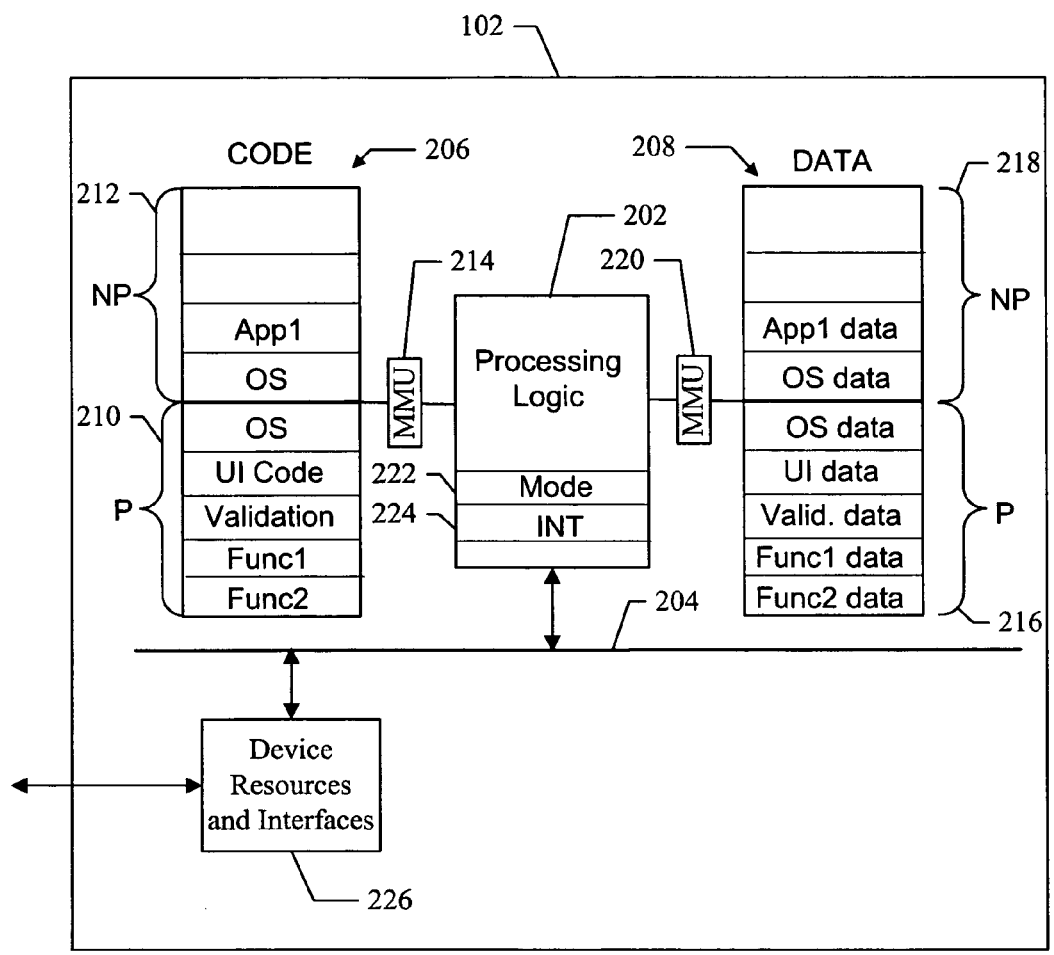
FIG. 2 shows a functional block diagram of a device comprising one embodiment of a transition system.

FIG. 2 shows a functional block diagram of the device 102 comprising one embodiment of a transition system. The device 102 comprises processing logic 202 and hardware resources 226 that are coupled to an internal data bus 204. Coupled to the processing logic 202 are code memory 206, data memory 208.

In one or more embodiments, the processing logic 202 comprises a CPU, processor, gate array, hardware logic, memory elements, virtual machine, software, I/O interfaces, and/or any combination of hardware and software. Thus, the processing logic 202 generally comprises logic to execute machine-readable instructions.

The device resources 226 comprise hardware and/or software resources that operate to provide device interfaces, mass storage, user I/O, and any other type of device resource. For example, instructions may be loaded into the device 102 via a local storage system, such as a floppy disk, CDROM, Flash memory, or other local storage that is interfaced to the device 102 via the device resources 226. In another embodiment, the instructions may be downloaded into the device 102 from a network resource, such as a network server or any other type of network resource that is also interfaced to the device 102 via the device resources 226. The instructions, when executed by the processing logic 202, provide one or more embodiments of a transition system as described herein.

In one embodiment, code memory 206 comprises RAM, ROM, FLASH, EEROM, or any other suitable type of memory, or a combination thereof. The code memory 206 is partitioned into a privileged region (P) 210 and a non-privileged region (NP) 212. The privileged region 210 includes program code that when executed has unrestricted access to the memory or other systems of the device 102. For example, the privileged code region 210 comprises operating system code (OS), user interface code (UI), validation code, and first and second privileged function code (FUNC 1) and (FUNC 2). The code shown in the privileged code region 210 is representative of the types of privileged code that may be included in the device 102. It is also possible that the privileged code region 210 includes other types of privileged code for execution on the device 102.

The non-privileged code region 212 includes program code that when executed is restricted to accessing only selected memory regions. For example, the non-privileged code region 212 comprises OS code and application code (App1). In one embodiment, the application code may be code that is downloaded to the device 102, installed at device manufacture, or added to the device from a local memory or system. Also coupled to the code memory 206 is a memory management unit (MMU) 214. The MMU 214 operates to restrict the operation of non-privileged program code so that non-privileged code has limited access rights to selected regions of the code memory 206.

In one embodiment, data memory 208 comprises a privileged region 216 and a non-privileged region 218. The privileged region 226 comprises data regions that may be accessed only by privileged program code. For example, the privileged data region 216 comprises data used by the OS, UI, validation, FUNC 1 and FUNC 2 code. The non-privileged data region 218 includes data regions that may be accessed by non-privileged program code. For example, the non-privileged data region 218 comprises data used by the non-privileged OS and App1 program code. Also coupled to the data memory 208 is a memory management unit (MMU) 220. The MMU 220 operates to restrict access to the non-privileged and privileged data regions. For example, a non-privileged application is restricted from accessing data in the privileged data region 216, or data belonging to other non-privileged applications in the non-privileged data region 218.

The processing logic 202 also comprises mode logic 222 and interrupt logic 224. The mode logic 222 comprises a CPU, processor, logic, device registers, software, or any combination of hardware and software that operates to allow a mode change between operating modes of the device 102. For example, in one embodiment, the mode logic 222 comprises a register whose bits set the operating mode. For example, to switch from privileged mode to non-privileged mode, selected bits in the register are set, which results in a non-privileged stack being restored and program execution continuing in the non-privileged mode.

The interrupt logic 224 comprises a CPU, processor, logic, software, or any combination of hardware and software that operates to allow an interrupt to be received and processed by the processing logic 202. For example, the interrupt logic 224 may receive a software interrupt that is generated by program code executed by the processing logic 202. In one embodiment, the transition system uses the software interrupt to allow non-privileged program code to execute a privileged function within the same task and priority. In one embodiment, the interrupt logic 224 processes software interrupts, hardware interrupts, program exceptions, or any other type of interrupt as part of the operation of the transition system.

It should be noted that the configuration of the device 102 is just one suitable configuration for implementing the described transition system. It is also possible to implement one or more embodiments of the transition system using other device configurations, functional elements or element configurations within the scope of the present invention.

During operation of the transition system, the processing logic 202 executes non-privileged application code (i.e., App1) that requires the services of a privileged function (i.e., FUNC 1). The application generates a software interrupt that has an associated function index. The interrupt is handled by the interrupt logic 224, and in response to the interrupt, the processing logic 202 runs the privileged validation code, which validates that the requested function is a trusted function, and that the requested function will not provide the non-privileged code more access rights than it is entitled to. If the request is validated, the requested privileged function is executed by the processing logic 202. For example, App1 may generate a software interrupt with a function index identifying FUNC 1 as the desired privileged function to be performed. After the request is validated, the processing logic 202 executes the privileged function FUNC 1. At the completion of FUNC 1, the processing logic 202 returns to the non-privileged mode using the mode logic 222 and continues execution of App1 in the non-privileged mode.

In one embodiment, the described transition system comprises program instructions stored on a computer-readable media, which when executed by the processing logic 202, provide a transition system that operates as described herein. In one or more embodiments, the computer-readable media comprises a floppy disk, CD, memory card, FLASH memory device, RAM, ROM, or any other type of memory device.

Figure 3:
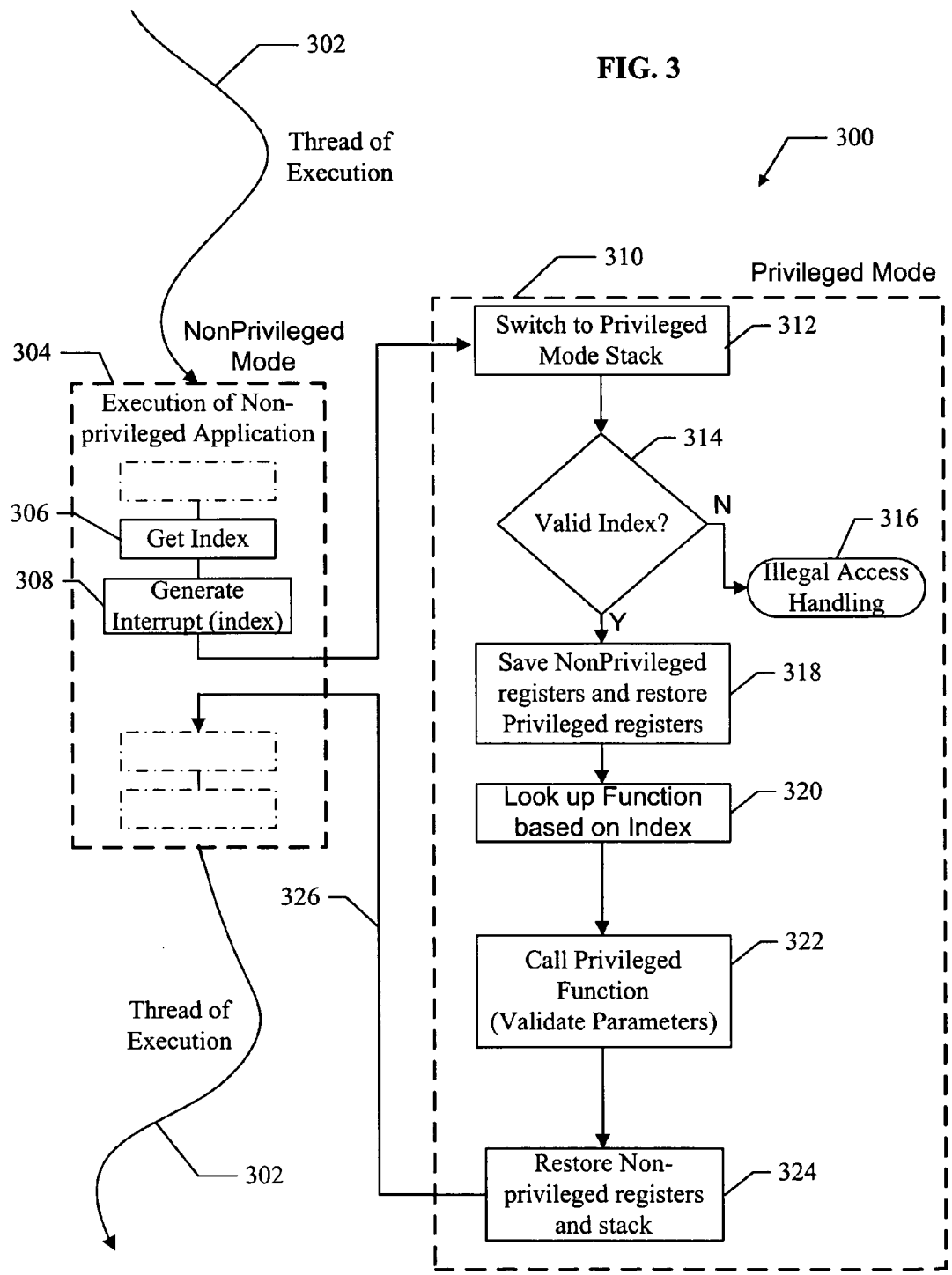
FIG. 3 shows a flow diagram that illustrates the operation of one embodiment of a transition system for use in a device.

FIG. 3 shows a flow diagram 300 that illustrates the operation of one embodiment of a transition system for use in a device, for example the device 102. For clarity, the flow diagram 300 will be described with reference to the device shown in FIG. 2. It will be assumed that the device is executing a BREW runtime system that operates to create a non-privileged thread of execution 302. The execution thread 302 represents the execution of non-privileged applications on the device.

A system scheduler (not shown) operates to schedule the execution of applications to form the thread of execution 302. Typically, the scheduler operates to schedule execution based on priority. Because the transition system described herein allows privileged mode functions to execute within the same thread of execution as the invoking non-privileged application, new tasks are not created, and as a result, the scheduler operation is simplified.

During execution of the thread 302, a non-privileged application 304 is executed. The application 304 may be a viewer application that allows the device to display various multimedia content to the device user. As the application 304 executes, a requirement for the services of a privileged function occurs. At block 306, that application obtains an index that is associated with the privileged function. At block 308, the application 304 generates an interrupt that operates to request the operating mode of the device to transition to the privileged mode 310 so that the privileged function can execute.

The interrupt 308 may be a software interrupt or any other type of interrupt that may be generated by the application 304. The interrupt includes an index that identifies the privileged function to be performed. For example, the interrupt may be processed by interrupt logic 234 shown in FIG. 2.

After the interrupt is received, program execution flows to privileged mode 310 where a switch to a privileged mode stack occurs at block 312. For example, in one embodiment, the privileged mode stack is memory associated with the thread 302 for use when in the privileged mode.

A test is performed at block 314 to determine if the index is valid. For example, the index identifies a privileged function to be performed. Each privileged function that is trusted by the system is associated with an index. The test at 314 determines if the received index is associated with a trusted privileged function. For example, in one embodiment, a table of indexes is searched to determine if the index passed by the interrupt is associated with a trusted function. If the index does not identify a trusted function, the program execution flows to 316 where an illegal access handling routine processes the error. For example, the handling routine 316 may return an error code to the non-privileged application 304.

If the index does identify a trusted privileged function, the program flow continues to block 318 where the non-privileged registers (i.e., registers, memory pointers, etc.) are saved, and registers associated with the privileged mode are restored. Once the privileged mode registers are restored, the program proceeds to block 320 where the desired privileged function is determined based on the index. For example, a table of privileged functions is search based on the index to determine the desired function.

Once the privileged function is determined, it is called at block 322. For example, the privileged function may operate to open a particular system file that contains data for use by the non-privileged application 304. In one embodiment, additional parameters are passed to the privileged function from the application 304. For example, the parameters may further indicate or define the type of service being requested by the non-privileged application 304. For example, in one embodiment, the parameters are passed via device registers in the form of [subsystem] [method], where the "subsystem" indicates the resource, and the "method" indicates what function is to be performed.

The privileged function operates to validate these parameters to verify that execution of the privileged function will not exceed the privileges granted to the application 304. For example, the function operates to validate the parameters so that execution of the function will not exceed memory restrictions placed on the application 304. In one embodiment, the validation program shown in FIG. 2 performs the validation. The validation program retrieves a permissions list that identifies rights, privileges and restrictions impose on the application. For example, the permissions list may be stored in the validation data region located in the privileged data region 226, also shown in FIG. 2. The validation program operates to compare the operation of the requested function with the permissions list associated with the application. Thus, the validation is contextual in that the validation program knows what the function will attempt to do based on the parameters passed by the non-privileged application.

In one embodiment, if the parameters are not valid or if the parameters would result in an illegal memory access, the privileged function does not execute and an error is returned to the application 304. If the parameters are valid, the privileged function executes to provide the desired service to the application 304.

After the function is performed, program execution flows to block 324 where the non-privileged mode registers are restored, including the non-privileged mode stack. The program execution returns to the non-privileged application 304 as shown at path 326. For example, the mode logic 232 shown in FIG. 2 may be used to return to the non-privileged mode. Thus, the transition system operates to allow a non-privileged application to execute privileged functions without creating a new task, thereby avoiding the overhead of new task creation, scheduling and dispatcher latency.

It should be noted that the program flow diagram 300 illustrates just one embodiment and that changes, additions, or rearrangements of the program elements may be made without deviating from the scope of the invention.

Accordingly, while one or more embodiments of methods and apparatus for a transition system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

I claim:

1. A method for providing transitions between operating modes of a device, wherein the operating modes comprise a privileged mode and a non-privileged mode, the method comprising:

executing an application in the non-privileged mode;

generating an interrupt to request the services of a privileged function; and transitioning to the privileged mode to execute the privileged function; wherein said step of transitioning does not create or schedule a new task, said step of transitioning comprises switching to a privileged mode stack, and the privileged function is executed as part of the same thread of execution as the application.

2. The method of claim 1, wherein the interrupt is a software interrupt.

3. The method of claim 1, further comprising validating that the privileged function is a trusted function.

4. The method of claim 1, further comprising validating that the execution of the privileged function will not exceed access rights associated with the application.

5. The method of claim 1, further comprising transitioning to the non-privileged mode to execute the application when the execution of the privileged function is completed.

6. A method for providing transitions between operating modes of a device, wherein the operating modes comprise a privileged mode and a non-privileged mode, and the method comprising:
   executing an application in the non-privileged mode;
   generating an interrupt to request the services of a privileged function; and
   transitioning to the privileged mode to execute the privileged function, wherein said transitioning does not create or schedule a new task and comprises:
      switching to a privileged mode stack; and
      the privileged function is executed as part of the same thread of execution as the application.

7. The method of claim 1, wherein the device is a wireless device.

8. An apparatus for providing transitions between operating modes of a device, wherein the operating modes comprise a privileged mode and a non-privileged mode, the apparatus comprising:
   a processing logic that operates to execute an application in the non-privileged mode;
   a interrupt logic that operates to receive an interrupt that requests the services of a privileged function; and
   a transition logic that operates to transition to the privileged mode to execute the privileged function; wherein
      said transition to the privileged mode does not create or schedule a new task,
      said transition to the privileged mode comprises switching to a privileged mode stack, and
      the privileged function is executed as part of the same execution thread as the application.

9. The apparatus of claim 8, wherein the interrupt is a software interrupt.

10. The apparatus of claim 8, further comprising validation logic that operates to validate that the privileged function is a trusted function.

11. The apparatus of claim 8, further comprising validation logic that operates to validate that the execution of the privileged function will not exceed access rights associated with the application.

12. The apparatus of claim 8, wherein the device is a wireless device.

13. An apparatus for providing transitions between operating modes of a device, wherein the operating modes comprise a privileged mode and a non-privileged mode, the apparatus comprising:
   a means for executing an application in the non-privileged mode;
   a means for receiving an interrupt that requests the services of a privileged function; and
   a means for transitioning to the privileged mode to execute the privileged function; wherein
      said transition to the privileged mode comprises switching to a privileged mode stack,
      said transition to the privileged mode does not create or schedule a new task, and
      the privileged function is executed as part of the same execution thread as the application.

14. The apparatus of claim 13, wherein the interrupt is a software interrupt.

15. The apparatus of claim 13, further comprising means for validating that the privileged function is a trusted function.

16. The apparatus of claim 13, further comprising means for validating that the execution of the privileged function will not exceed access rights associated with the application.

17. The apparatus of claim 13, wherein the device is a wireless device.

18. A computer-readable media tangibly storing a sequence of instructions, which when executed by a processor in a device, operate to cause a computer to provide transitions between operating modes of the device, wherein the operating modes comprise a non privileged mode and a privileged mode, and the sequence of instruction comprising:
   instructions for executing an application in the non-privileged mode;
   instructions for generating an interrupt to request the services of a privileged function; and
   instructions for transitioning to the privileged mode to execute the privileged function; wherein
      said transition to the privileged mode comprises switching to a privileged mode stack,
      said transition to the privileged mode does not create or schedule a new task, and
      the privileged function is executed as part of the same thread of execution as the application.

19. The computer-readable media of claim 18, wherein the interrupt is a software interrupt.

20. The computer-readable media of claim 18, further comprising instructions for validating that the privileged function is a trusted function.

21. The computer-readable media of claim 18, further comprising instructions for validating that the execution of the privileged function will not exceed access rights associated with the application.

22. The computer-readable media of claim 18, further comprising instructions for transitioning to the non-privileged mode to execute the application when the execution of the privileged function is completed.

23. The computer-readable media of claim 18, wherein the device is a wireless device.

* * * * *